United States Patent [19]
Kim

[11] Patent Number: 5,390,989
[45] Date of Patent: Feb. 21, 1995

[54] ADJUSTABLE PRESSURE VARIABLE RESPONSE FLUID BRAKE SYSTEM ACCUMULATOR

[76] Inventor: Joowon Kim, 102-703 Newseoul Apt. 255-1, Sankok-Dong, Puk-Ku, Inch'on, Rep. of Korea

[21] Appl. No.: 107,060

[22] Filed: Aug. 17, 1993

[30] Foreign Application Priority Data

Mar. 24, 1993 [KR] Rep. of Korea .................. 1993-4432

[51] Int. Cl.$^6$ ............................................. B60T 17/04
[52] U.S. Cl. ........................................ 303/87; 138/30
[58] Field of Search ...................... 138/30, 31; 303/87

[56] References Cited

U.S. PATENT DOCUMENTS

| | | | |
|---|---|---|---|
| 2,132,952 | 10/1938 | Hewitt | 138/30 |
| 3,430,660 | 3/1969 | Mitton | 138/30 |
| 4,188,073 | 2/1980 | Ishikawa et al. | 303/87 |
| 4,571,009 | 2/1986 | Jones | 303/87 |
| 5,036,879 | 8/1991 | Ponci | 138/30 |
| 5,058,961 | 10/1991 | Mergenthaler et al. | 303/87 |
| 5,074,625 | 12/1991 | Jones | 303/87 |

*Primary Examiner*—Matthew C. Graham
*Attorney, Agent, or Firm*—Brady, O'Boyle & Gates

[57] ABSTRACT

In an accumulator housing for brake system fluid pressure a resilient bulb has a portion expandable by fluid pressure inserted in a sleeve which prevents radial expansion of the expandable bulb and allows only expansion of the end wall thereof toward the bottom wall of a bore in the housing in which the sleeve is inserted. This expansion of the end wall only is enhanced by a coating of lubricant on the inside surface of the sleeve. A pair of discs inside the bottom of the sleeve are normally maintained in contact between the end wall of the expandable bulb and bottom wall of the bore by disc springs connected therebetween with bosses on the respective discs extending toward each other through the inner bores of the springs and terminating in spaced apart stop surfaces. The stop surfaces move into abutment with each other on expansion of the end wall under pressure to prevent further compression of the springs and further expansion of the bulb thus prolonging the life of both members.

5 Claims, 3 Drawing Sheets

ADJUSTABLE PRESSURE VARIABLE RESPONSE FLUID BRAKE SYSTEM ACCUMULATOR

BACKGROUND OF THE INVENTION

The present invention relates to an improvement in the structure of a hydraulic anti-lock brake system which is to be fixed between a master cylinder and a cylinder pipe for feeding brake fluid pressure to the brake mechanism of automobile wheels, and more particularly to a device that accumulates or stores a part of the fluid pressure to be transferred to the wheels upon braking of the automobile, and then continuously feeds the fluid pressure by dividing so that the locking phenomena of brakes, produced upon sudden quick braking, is prevented, thereby preventing loss of steering control, and the like. More particularly, it relates to an article made such that the expansion rate of a resiliently expandable bulb is maximized by making the expanding direction of the bulb to be concentrated to one direction when the bulb is expanded by feeding of hydraulic pressure, so that not only the life of the bulb is extended, but also separate spring and spring protecting structure upon feeding excessive pressure, as well as a supporting tube for minimizing the friction upon operating, are provided, whereby stored hydraulic pressure can be resiliently and more strongly fed by dividing, and also damage of parts can be prevented upon feeding an excessive pressure, and at the same time the friction coefficient between the interior surface of the body and parts is decreased, so that not only the life of the parts is extended, but also the operating effect is furthermore improved.

Heretofore a number of techniques for hydraulic anti-lock brake systems have been patented and are known, for instance, U.S. Pat. No. 3,430,660 to Mitton; U.S. Pat. No. 4,571,009 to Jones; and U.S. Pat. No. 5,074,625 to Jones, and when reviewing their common structure, as shown in FIG. 1, a bulb 3 of rubber material is provided between upper body 1 and lower body 2, and a spatial portion 4 into which the expanding portion of the bulb 3 is inserted, and into which the volume of the bulb 3 can be expanded, is defined at the interior circumferential surface of the lower body 2, and when a pedal is pushed in order to apply the brake, hydraulic pressure of the brake is transferred to the brake mechanism of the wheel and to the hydraulic pressure inducing chamber 3' of the bulb, and the bulb 3 is expanded in volume toward the spatial portion 4 of arc shape, that is, the bulb 3 has the effect of storing a part of the hydraulic pressure, and even if the pedal is pushed with all one's might, a part of the produced hydraulic pressure is stored in the bulb, and therefore, a locking phenomena of the brake is prevented.

On the other hand, when the hydraulic pressure is consumed during operation of the brake, and it becomes lower than the stored pressure of the bulb 3, immediately the bulb 3 contracts and simultaneously a hydraulic pressure in the amount of the pressure difference is supplied, and this operation is repeated normally several times, to several tens of times, per second.

Accordingly, the conventional bulb operated by expanding in all directions in compliance with the thus continuous repeating process of expansion and contraction has had a problem that material deformation of the bulb, and deterioration of the resiliency, are rapidly increased, whereby the hydraulic pressure storing rate is decreased and the life is shortened. Since the rate of expansion and contraction becomes lowered in response to usage, it has also a problem that the dividing and feeding of the hydraulic pressure become less rapid, and at the same time the feeding pressure of the hydraulic pressure becomes lowered, whereby the braking distance of the brake systems becomes longer.

DETAILED DESCRIPTION OF THE INVENTION

Figure 1:
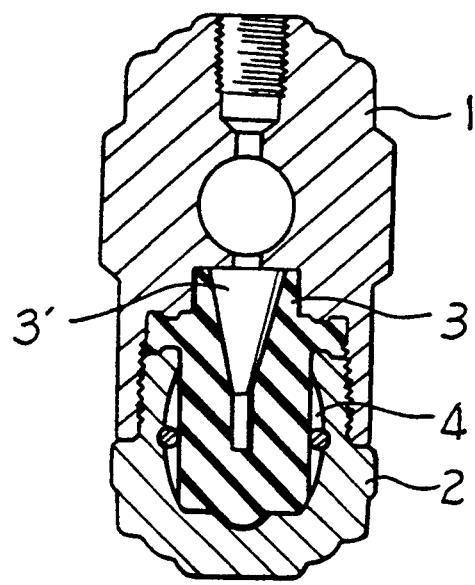
FIG. 1 is a cross-sectional view showing the structure of a conventional anti-lock brake systems.

The present invention is invented to solve the various conventional problems, as indicated above, and when explaining a structure of the present invention with reference to the accompanying drawings, it will be as follows.

In a known hydraulic anti-lock brake system provided with an upper body 1 in which an air valve A for discharging the air is provided at the upper end thereof, and an opening H extending laterally to the center of the upper body for fixing a connector thereto, is positioned at the middle portion thereof, and a female thread portion S for coupling is included at the interior circumferential surface of the lower end; a lower body 2 having a male thread portion S' to be coupled with said upper body 1; and a bulb 3 having a hydraulic pressure inducing chamber 3', a supporting flange 3'', and an expanding portion 3''', connected between said upper and lower bodies 1 and 2.

The invention comprises:

a vertical bore 10 formed in the lower body 2;

a supporting tube body portion 11, having a Teflon coating layer 11', is inserted in said vertical bore 10, the Teflon coating layer operative for decreasing a frictional resistance with the coupling part at the interior surface;

a resilient structural portion 12, which is inserted into the lower side of said supporting tube body 11, is contracted and biasingly flexed by the expansion of the bulb 3, for providing a resilient force for feeding the hydraulic pressure by dividing the hydraulic pressure; and a safety structure portion 13, which is positioned at the upper and lower portions of the resilient structural portion 12, for preventing damage of the resilient structural portion 12 upon feeding an excessive hydraulic pressure.

The resilient structural portion 12 includes a multiplicity of disc springs 12' of continuously adjoined state, and the safety structure portion 13 includes a pair of upper and lower annular pieces 14, 14', each with a raised center annular ridge 15 protruding through the center openings of the respective adjacent disc springs, for limiting the contraction at the center.

In the drawings, reference numeral 20 represents a master cylinder, numeral 21 is a T-type connector, numeral 22 is a connecter to be inserted into opening H of the upper body 1, and numeral 23 is a pipe.

Figure 2:
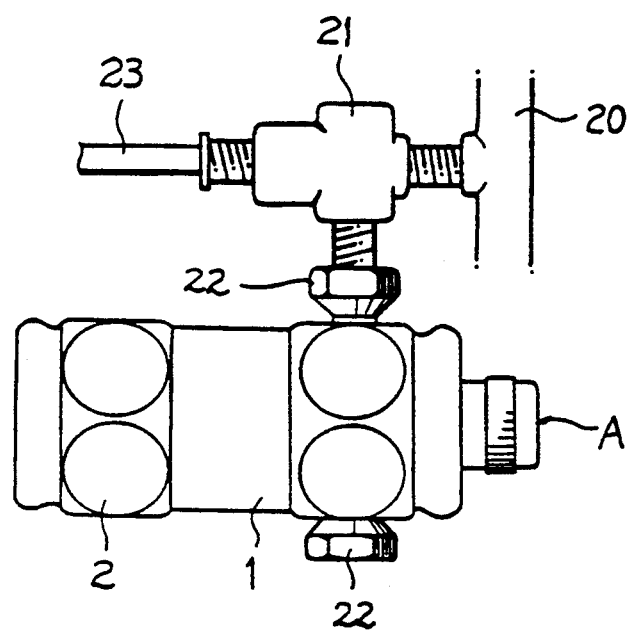
FIG. 2 is a diagram showing an equipped state of the anti-lock brake system.
Figure 3:
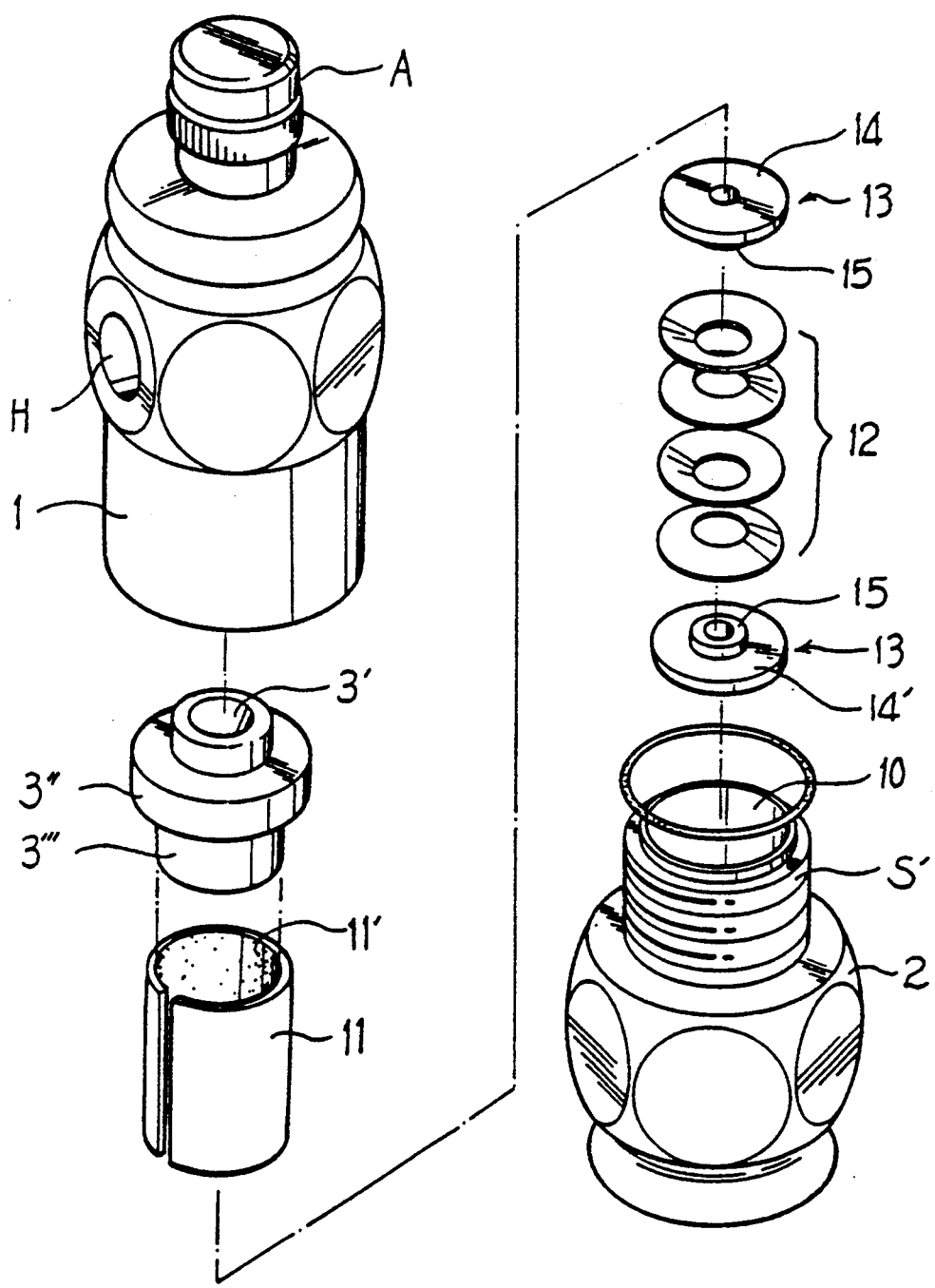
FIG. 3 is an exploded perspective view of a system of the present invention.

The present invention may be fixed, as shown in FIG. 2, by utilizing T-type connector 21, between a master cylinder 20 and pipe 23, and when a brake pedal (not shown) is pushed for braking, the hydraulic pressure of the brake system and master cylinder is directly applied to the brake and to the wheels through the T-type connector 21 and the cylinder pipe 23, and at the same time the hydraulic pressure is transferred to the upper body 1 through the connector 22, and fed to the hydraulic pressure inducing chamber 3' of the bulb 3. The expanding portion 3''' of the bulb 3 is expanded in volume by this hydraulic pressure, and since it is in a state that the external circumferential surface of the expanding portion 3''' of the bulb 3 is in close contact within the supporting tube body 11, a sideward volume expansion becomes impossible, and thereby the expansion of the volume is only downwardly directed.

Accordingly, the downward axial expansion of expanding portion 3''' presses the upper annular piece 14 with as much pressure as produced by the increased volume of the expanding portion 3''', and this annular piece 14 moves into contact with the disc springs 12', and this process compresses the disc springs to a state of storing a part of the generated hydraulic pressure.

Figure 5:
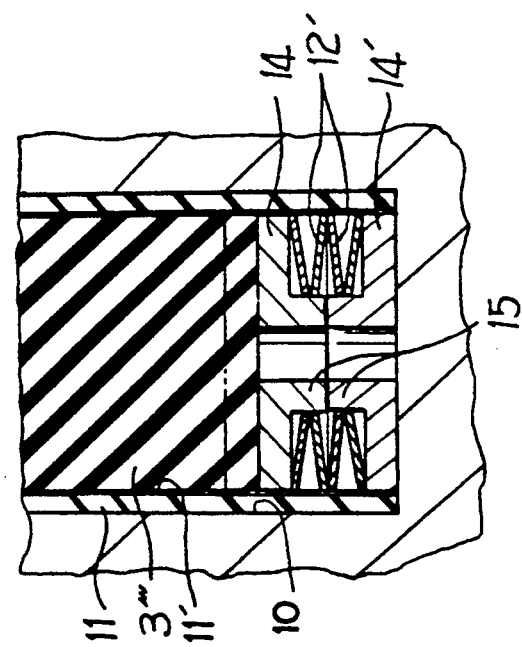
FIG. 5 is a diagram showing a protecting state of a disc spring upon feeding an excessive pressure.
Figure 4:
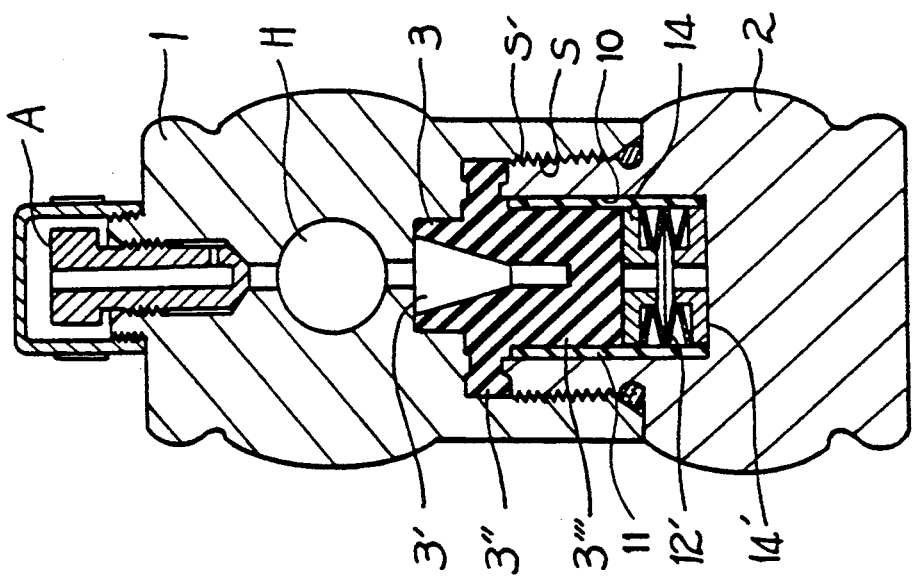
FIG. 4 is a cross-sectional view of an assembled state of the system of the present invention.

The resilient structural portion 12 is established with self biasing or extension providing pressure, and contraction storing pressure, on the basis of maximum and minimum values of the brake pressure which are normally generated. If an excessive hydraulic pressure, more than the contraction or compression storing value, is fed, as in FIG. 5, the raised center annular ridges 15 of the upper and lower annular pieces 14, 14' of the safety structure portion 13, move into abutment with each other by the increased quantity or volume of the downwardly expanding portion 3''' expanded in maximum value, and this abutting stop action prevents the disc springs 12' from being further contracted, therefore, damage of the disc springs 12' can be prevented.

When the hydraulic pressure transferred to the wheel by the braking operation is consumed, whereby it falls to below the pressure received by the resilient structural portion 12, immediately a part of the stored hydraulic pressure in the expanding portion 3''' is fed to the wheel through the connector 22 until the hydraulic pressure transfer to the wheel, and the hydraulic pressure of the expanding portion 3''', become even, whereby the braking force is reenforced, and this operation explains a moment upon braking, and normally one braking operation has dividing and transferring functions occurring several times, to several tens of times, per second.

In the above description, since the disc springs 12' are also bounded by the supporting tube body 11, simultaneously when the expanding portion 3''' is contracted, the bottom of the expanding portion 3''' is pressed, the contracting function is further reenforced, and thereby, even if the resiliency of the bulb 3 is deteriorated by longtime usage, constantly good contracting ability is maintained so that a rapid dividing and feeding function of the hydraulic pressure can be provided, and therefore the hydraulic pressure storing ability and life of the bulb 3 are further extended.

Since the supporting tube body 11, even though the bottom surface of the vertical bore 10 may not be horizontally level, the tube body can set the lower annular piece 14', inserted in the tube body, to be in a vertical aligned state, the contraction and the extension biasing force of the resilient structural portion 12 are made to be evenly distributed in a linear state, whereby providing prevention of deformation of the disc springs 12', and dividing and feeding functions of the hydraulic pressure are decreased. Since the frictional coefficient between the supporting tube body 11 and the external circumferential surface of the expanding portion 3''' of the bulb 3, and the upper and lower annular pieces 14, 14', and the disc springs 12', is remarkably decreased by the Teflon coating layer 11' formed on the internal circumferential surface of the supporting tube body 11, the contraction and the extension biasing force of the resilient structural portion 12 can be transferred without loss, whereby smoothness of function can be obtained, and simultaneously wear of the contracting surface by friction is decreased, whereby an extending effect of life can be obtained.

Thus, the present invention relative to that which has caused a deterioration of short life of the bulb and various functions in storing, dividing and feeding the hydraulic pressure by being contracted and bounded only by a material characteristic of the bulb itself as convention, is a useful invention capable of obtaining a larger storing ability of the hydraulic pressure and a life extension of the bulb, as well as a rapid hydraulic pressure dividing and feeding function, due to a structural change and addition of the function incorporated with the bulb.

What is claimed is:

1. A brake system fluid accumulator for use in fluid brake systems, comprising:

a housing including an upper body portion threadably connected to a lower body portion;

a bulb cavity substantially enclosed within said upper and lower body portions;

said bulb cavity including an axial bore in said lower body portion having a bottom wall;

a tubular body fitted in said axial bore and being substantially coextensive with said axial bore, said tubular body having an inner wall;

a resilient bulb mounted within said bulb cavity, said resilient bulb having an interior fluid pressure inducing chamber portion and an expandable portion;

a brake fluid passage-way through said housing in communication with, and adapted to communicate brake fluid to, said interior fluid pressure inducing chamber portion for expanding said expandable portion;

said expandable portion having a side wall and a bottom end wall, at least said expandable portion extending into said tubular body with said side wall of said expandable portion in contact substantially throughout the length thereof with said inner wall of said tubular body to prevent radial expansion of said side wall and to allow only axial expansion of said bottom end wall of said expandable portion;

upper and lower annular members in said tubular body respectively in contact with said bottom end wall of said expandable portion and said bottom wall of said axial bore, spring means connected between and maintaining said upper and lower annular members in contact with said bottom end wall and said bottom wall, and boss portions with respective stop surfaces spaced from each other on said upper and lower annular members respectively;

whereby responsive to increased pressure within said interior fluid pressure inducing chamber only axial expansion of said bottom end wall of said expandable portion results, compressing said spring means until said stop surfaces are moved into abutment thereby preventing further expansion of said expandable portion.

2. A brake system fluid accumulator as set forth in claim 1, in which said spring means comprise a plurality of disc springs connected in axial contact with each other and having circumferential edge portions immediately adjacent said inner wall of said tubular body.

3. A brake system fluid accumulator as set forth in claim 1, in which said lower annular member has a bottom surface in contact with said bottom wall of said axial bore, and a central lower boss extending upwardly therefrom, and having a top surface forming a lower stop surface; said upper annular member has a top surface in contact with said bottom end wall of said expandable portion, and a central upper boss depending therefrom and having a lower surface forming an upper stop surface spaced from said lower stop surface.

4. A brake system fluid accumulator as set forth in claim 1, in which said upper and lower annular members have circumferential edge surfaces in sliding contact with said inner wall of said tubular body.

5. A brake system fluid accumulator as set forth in claim 1, including a coating of lubricant material on said inner wall of said tubular body thereby decreasing frictional resistance between said inner wall of said tubular body and said side wall of said expandable portion and enhancing only axial expansion of said bottom end wall of said expandable portion.

* * * * *